(12) United States Patent
Donohue

(10) Patent No.: US 10,596,793 B2
(45) Date of Patent: *Mar. 24, 2020

(54) SINGLE AXIS APPLICATOR

(71) Applicant: Erdman Automation Corporation, Princeton, MN (US)

(72) Inventor: Morgan Donohue, Mendota Heights, MN (US)

(73) Assignee: Erdman Automation Corporation, Princeton, MN (US)

( * ) Notice: Subject to any disclaimer, the term of this patent is extended or adjusted under 35 U.S.C. 154(b) by 234 days.

This patent is subject to a terminal disclaimer.

(21) Appl. No.: 15/604,195

(22) Filed: May 24, 2017

(65) Prior Publication Data

US 2017/0320308 A1 Nov. 9, 2017

Related U.S. Application Data

(63) Continuation of application No. 14/668,333, filed on Mar. 25, 2015, now Pat. No. 9,669,609, which is a
(Continued)

(51) Int. Cl.
*B32B 37/00* (2006.01)
*B05C 5/02* (2006.01)
(Continued)

(52) U.S. Cl.
CPC ........ *B32B 37/0076* (2013.01); *B05C 5/0216* (2013.01); *B32B 37/0046* (2013.01);
(Continued)

(58) Field of Classification Search
USPC ....... 118/300, 305, 500, 503, 692, 696, 712; 156/578, 109, 285, 244.25; 414/676, 783
See application file for complete search history.

(56) References Cited

U.S. PATENT DOCUMENTS 4,120,999 A 10/1978 Chanel et al.
5,069,739 A 12/1991 Kautt
(Continued)

OTHER PUBLICATIONS

GlassMachineryLocator.com Machine Details, Glass Machinery—Insulated Glass (IG) Equipment, Jan. 23, 2012, 2 pages.
(Continued)

*Primary Examiner* — Yewebdar T Tadesse
(74) *Attorney, Agent, or Firm* — Patterson Thuente Pedersen, P.A.

(57) ABSTRACT

A single axis application unit for processing a glass workpiece includes a workpiece supporting table, an applicator movable on a traveler shiftable along a first linear axis and a central suction unit that is activateable to grip the glass workpiece that travels along a second linear axis oriented generally perpendicular to the first linear axis. A central suction unit brake selectively secures the central suction unit both rotationally and translationally. The central suction unit is freely moveable both translationally and rotationally when the central suction unit brake is released. A mid-peripheral suction unit is located at a fixed location remote from the central suction unit and selectively activateable to grip the glass workpiece to hold the glass workpiece in a fixed orientation. A corner suction gripper is movable with the applicator parallel to the first linear axis, and is selectively activateable to grip the glass workpiece.

15 Claims, 14 Drawing Sheets

Related U.S. Application Data continuation of application No. 13/568,749, filed on Aug. 7, 2012, now Pat. No. 8,997,685.

(51) Int. Cl.
  *B32B 37/12* (2006.01)
  *B32B 37/16* (2006.01)
  *B32B 38/18* (2006.01)
  *E06B 3/673* (2006.01)

(52) U.S. Cl.
  CPC .............. *B32B 37/12* (2013.01); *B32B 37/16* (2013.01); *B32B 38/185* (2013.01); *B32B 2307/412* (2013.01); *B32B 2419/00* (2013.01); *E06B 3/6733* (2013.01); *E06B 3/67352* (2013.01)

(56) References Cited

U.S. PATENT DOCUMENTS

| | | | |
|---|---|---|---|
| 5,246,331 A | 9/1993 | Hallahan et al. | |
| 5,413,156 A | 5/1995 | Lisec | |
| 5,433,818 A | 7/1995 | Lee | |
| 5,609,717 A | 3/1997 | Pascale et al. | |
| 5,879,040 A * | 3/1999 | Nagai | F16B 47/00 279/3 |
| 6,030,475 A | 2/2000 | Spotts, Jr. | |
| 6,180,196 B1 | 1/2001 | Glover et al. | |
| 6,360,804 B1 | 3/2002 | Field et al. | |
| 6,494,245 B1 | 12/2002 | Simone | |
| 7,001,464 B1 | 2/2006 | Erdman et al. | |
| 7,712,503 B2 | 5/2010 | Spotts | |
| 2004/0188485 A1 | 9/2004 | Lisec | |
| 2007/0074803 A1 | 4/2007 | Spotts et al. | |
| 2011/0154635 A1 | 6/2011 | Wunnicke et al. | |
| 2012/0118473 A1 | 5/2012 | Donohue | |
| 2013/0061978 A1 | 3/2013 | Donohue | |
| 2014/0041583 A1 | 2/2014 | Donohue | |
| 2015/0197076 A1 | 7/2015 | Donohue | |

OTHER PUBLICATIONS

GED Integrated Solutions, FS-7000 Fiberglass Automated Assembly System, 2011, 3 pages.

Application and File History for U.S. Appl. No. 13/568,749, filed Aug. 7, 2012. Inventor: Morgan Donohue.

Application and File History for U.S. Appl. No. 14/668,333, filed Mar. 25, 2015. Inventor: Morgan Donohue.

* cited by examiner

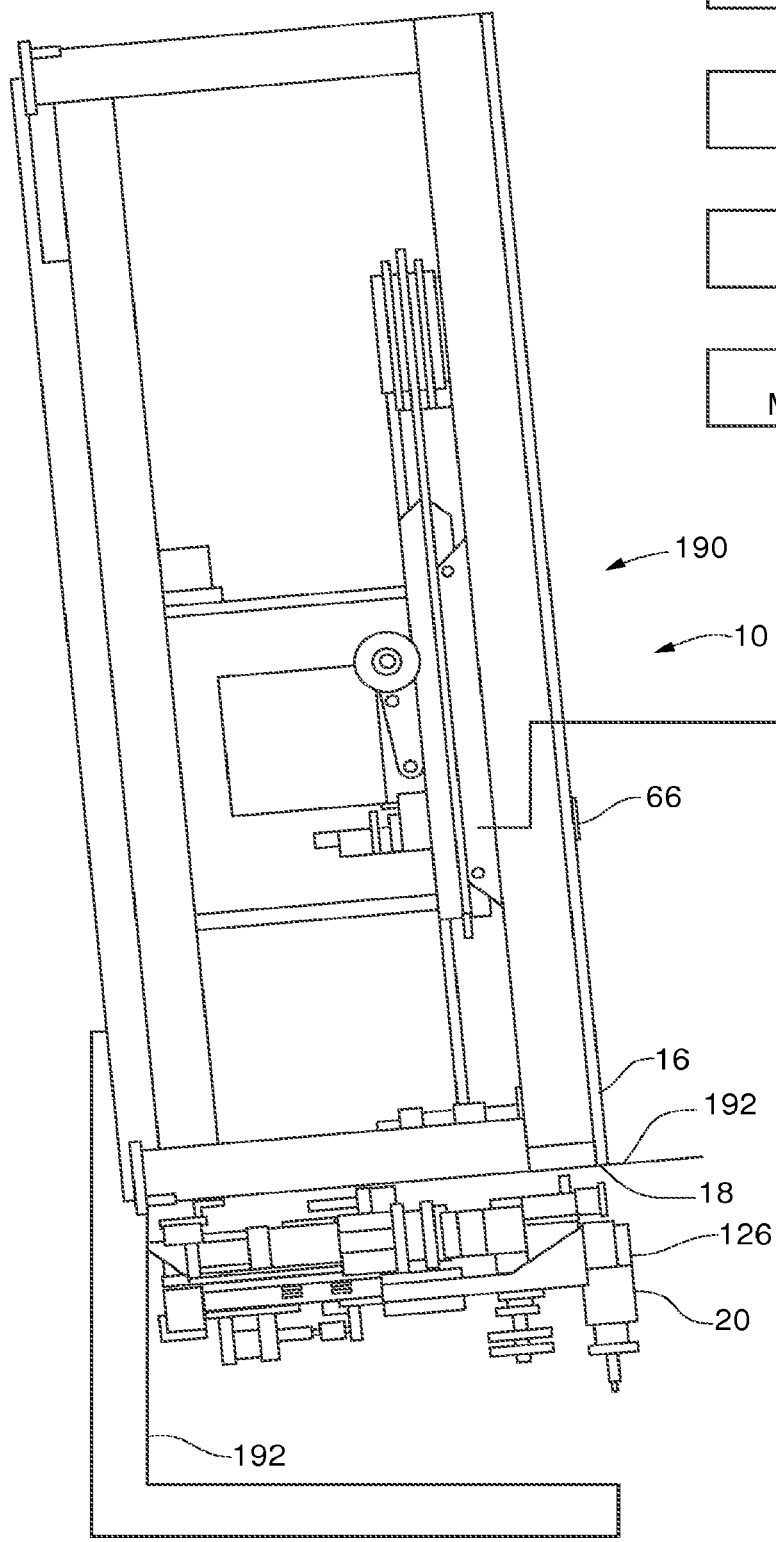
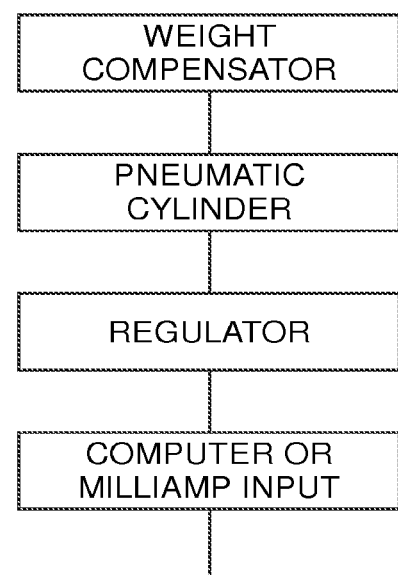
Fig. 13

SINGLE AXIS APPLICATOR

CROSS-REFERENCE TO RELATED APPLICATIONS

This application is a continuation of application Ser. No. 14/668,333, filed Mar. 25, 2015, entitled "Single Axis Applicator", which in turn is a continuation of application Ser. No. 13/568,749, filed Aug. 7, 2012, entitled "Single Axis Applicator", now U.S. Pat. No. 8,997,685, issued Apr. 7, 2015, each of which is hereby fully incorporated herein by reference.

TECHNICAL FIELD

The invention relates to application of adhesive materials to the edges of glass panes used to make insulated glass units and to application of adhesive materials to the edges of insulated glass units that are partially assembled.

BACKGROUND

Insulated glass is heavily utilized in modern residential and commercial construction. In many areas of the country it is required by building code as an energy conservation measure. A single pane of glass alone has very little insulating value. Multi-pane insulated glass windows have much greater insulating value. Insulated glass units generally include at least two panes of glass having identical shapes. Sealants and adhesives are used to bond the glass panes to a perimeter spacer which separates the two panes of glass. The entire perimeter including the two panes of glass and the spacer are sealed to one another to eliminate movement of ambient air into the space between the two panes of glass.

The space is filled with dehydrated air or more commonly another gas such as argon, xenon or krypton. Sulfur hexafluoride is also used for gas filling. The filling of insulated glass units with argon or another gas that is not air has been found to increase the energy efficiency of the insulated glass units markedly. Some insulated glass units includes three panes of glass with two intervening spaces which are similarly filled with argon or another gas other than air and then edge sealed.

Fully robotic machinery exists to apply spacers to the edge of glass panes and to apply a secondary edge seal to partially complete insulated glass units. These machines generally include an application head that is made controllably movable by numerous servomotors and that moves in at least two and often three dimensions as well as rotating the application head as it is moved around the edges of the workpiece. These machines are effective but are complex and expensive.

The spacer in an insulated glass unit is inset from the peripheral edges of the glass panes leading to a trough shaped space bounded on two sides by the glass panes and on one side by the spacer. In the manufacturing of insulating glass units, this space is filled with an adhesive sealant which forms the, so called, secondary seal of the insulated glass unit. The secondary seal may be applied using a variety of different adhesive sealants. These include time setting sealants, such as silicones or butyl rubber sealants. Sometimes two part sealants utilizing a resin and a catalyst to polymerize the resin are utilized. More commonly in modern manufacturing, hot melt adhesive sealants are used. Hot melt adhesive sealants are general applied in a liquid state at a temperature of approximately 350° F. and harden upon cooling to ambient temperature.

In high volume manufacturing facilities, the secondary seal is commonly applied by fully automated equipment in which a computer controlled robotic sealant applying head is moved around the peripheral edges of the insulated glass unit under computer control and applies the sealant to the edge or edges of the insulated glass unit. Fully automated secondary edge sealing equipment of this sort can apply to the secondary seal to very large numbers of insulating glass units in a production run. Typically, the insulated glass units in these circumstances are produced in large runs of identical units.

Fully automated edge sealing equipment of this type requires highly precise computer numerically controlled programming in order to apply a consistent edge seal. Because of this and the requirement that the equipment be programmable to handle many different sizes and shapes of insulated glass units cause this sort of equipment to be quite expensive to purchase and maintain.

There also exist in the window and door manufacturing industry smaller manufacturing facilities at which short runs of custom made windows or doors are manufactured in small quantities or even in single unique units.

There is a need for simpler and less costly application devices in the window industry.

SUMMARY

The present invention solves many of the above-referenced problems and includes a single axis application unit for processing glass panes or insulated glass units. According to one embodiment of the invention, the single axis application unit includes a workpiece supporting table that supports a glass workpiece. The table has at least one rectilinear edge. The workpiece supporting table may include an air table to facilitate easy movement of glass workpieces.

The application unit also includes an applicator that is moveable on a traveler. The traveler is shiftable along a first linear axis that is parallel to the rectilinear edge and displaced outwardly of the rectilinear edge of the table. The applicator is structured to apply adhesive material to an edge of the glass workpiece. The applicator may include, for example, a spacer applicator or a secondary edge sealer. The applicator may optionally include a spacer piercing unit to pierce the spacer if gas filling of the insulated glass unit is desired.

According to an embodiment of the invention, the table includes, located within the perimeter of the table, a central suction gripper that is selectively activateable to grip the glass workpiece. The central suction gripper is mounted so as to be moveable along a second linear axis that is oriented perpendicular to the first linear axis and the rectilinear edge of the table. The movement of the central suction gripper is limited to within the perimeter of the table. The central suction gripper grips the glass workpiece generally in the geographic center of the workpiece but need not be precisely located at the geographic center to be effective. So long as the central suction gripper is not applied to the glass workpiece at a location near the peripheral edges of the workpiece the invention functions effectively.

According to one embodiment of the invention, the central suction unit further includes a brake that selectively locks the central suction unit in at least one of rotation or translation along the second linear axis of movement. When the central suction unit brake is released, the central suction unit is freely moveable both translationally and rotationally along the second linear axis. The brake is released at least during return movement of the applicator to permit rotation of the IGU or glass pane to achieve alignment of a next edge of the workpiece for application.

According to another embodiment of the invention, the central suction unit further includes a biasing or drive mechanism that may assist in positioning the central suction gripper to assist in loading, squaring or turning the workpiece. For example, in the case of a workpiece having a high aspect ratio, when a long side of the workpiece is abutted against the fence at the applicator side of the table, it may be beneficial to assist starting of rotational movement of the workpiece by application of a small force on the central suction gripper away from the fence. This force is applied by the biasing or drive mechanism. A force toward the fence may be useful in squaring the workpiece against the fence. A force applied to the central suction gripper to position it in the rough center of the workpiece may be useful when initially loading the workpiece onto the table.

According to another embodiment of the invention, at least one off-center suction gripper is located at a fixed location within the table perimeter remote from the central suction unit and is selectively activateable to grip the glass workpiece to assist in holding the glass workpiece in a fixed orientation relative to the table edge on which the applicator travels. The off center suction gripper aids the central suction unit brake in immobilizing the glass workpiece while the applicator travels along the first linear axis to apply adhesive material such as an adhesive spacer or edge sealing adhesive to the edge of the glass workpiece. The off center suction gripper is located remotely from the central suction unit but still within the perimeter of the smallest size glass workpiece that is expected to be worked on the table of the device. More than one off-center suction gripper may be utilized to accommodate a larger range of glass workpiece sizes.

According to an embodiment of the invention, the invention further includes a corner suction gripper that is coupled to and moves with the traveler and the applicator parallel to the first linear axis. The corner suction gripper is selectively activateable to grip the glass workpiece near a corner of the glass workpiece. The corner suction gripper may be conveniently located to grip the glass workpiece from below, though this should not be considered limiting to the invention. Generally, the corner suction gripper grips the workpiece at the end of the applicator's travel in an application direction and during return travel of the applicator to the application start position.

According to another embodiment of the invention, the corner suction gripper includes a rotational encoder that senses the rotational movement of the corner suction gripper as the workpiece is turned. Output from the rotational encoder can be used to sense when the workpiece has turned nearly ninety degrees and to control speed of movement of the corner suction gripper as the workpiece approaches contact with the fence at the end of the turning event. Alternately, a rotational encoder can be coupled with the central suction gripper.

According to an example embodiment of the invention, the applicator includes an insulated glass spacer applicator. According to another example embodiment of the invention, the applicator includes a secondary edge sealant applicator.

According to an example embodiment of the invention, the insulated glass unit spacer applicator may include a spacer clamp, a spacer corner notcher and a spacer cutter. The spacer clamp is adapted to grip the spacer material to position it along the edge of the glass workpiece as well as to release the spacer material when appropriate for application to the glass workpiece. The spacer material may be supplied from a drum like roll located adjacent the single axis applicator unit or incorporated into the single axis application unit.

The corner notcher is adapted to cut a notch into the spacer material at corners where the spacer material turns the corner without being completely cut. The spacer cutter is adapted to completely shear off or cut the spacer material at the end of a spacer application to sever the spacer material from the spacer supply so that it may be secured to the insulated glass unit under construction.

According to another example embodiment of the invention, the insulated glass unit spacer applicator further includes a corner gripper backer block that is selectively shiftable between a downwardly bearing position and upward retracted position. The corner gripper backer block applies a force to the opposite of the glass workpiece in the vicinity of the corner suction gripper to facilitate the turning of the glass workpiece when the applicator returns to its initial application position.

According to another embodiment of the invention, the insulated glass unit spacer applicator further includes a corner press block that is also selectively shiftable from an upward retracted position to a spacer corner pressing position. The corner press block presses down on the spacer that has been applied at the corner of the glass workpiece to assist in achieving proper adhesion between the spacer and the glass workpiece.

According to another embodiment of the invention, the applicator further includes an alignment fence coupled to the applicator. The alignment fence is oriented generally parallel to and outwardly of the rectilinear edge of the table. The alignment fence serves to provide an alignment surface against which the edge of the glass workpiece can be accurately aligned parallel to the rectilinear edge of the table for application of material to its edge. The alignment fence may further include a fence abutment sensor to sense when the edge of the glass workpiece is securely located against the alignment fence.

According to another embodiment of the invention, the applicator further includes a first directional edge sensor and a second directional edge sensor coupled to the applicator. The first directional edge sensor locates a first edge of the glass workpiece as the applicator travels and the second directional edge sensor locates a second edge of the glass workpiece as the applicator travels parallel to the edge of the glass workpiece.

According to another embodiment of the invention, the applicator includes an edge sealant dispenser. In accordance with an example embodiment of the invention, the edge sealant dispenser generally includes a high volume metering pump, a dispensing nozzle, a depth sensor, a dam, proximity sensors and a device for sensing movement relative to the workpiece.

The edge sealant dispenser may also include proximity sensors, for example, to sense the presence of an insulated glass unit to cause lowering of the dispensing head and extension of the dam. A second proximity sensor may be utilized to actuate an auto-stop of the dispensing pump when the end of a side of the insulated glass unit is reached.

The high volume metering pump in accordance with one aspect of the invention may have a volume capacity of approximately 15 gallons per minute which far exceeds the required pumping capacity for edge sealing. The use of this high volume pump permits the pump to operate at 30-50 revolutions per minute instead of approximately 200 revolutions per minute. This arrangement greatly increases the useful life of the high volume metering pump.

An example dispensing nozzle in accordance with the invention generally includes a dispensing orifice and a ski assembly which permits the dispensing nozzle to ride along the edge of an insulated glass unit.

The dispensing nozzle orifice may be generally slot or dumbbell shaped and oriented perpendicular to the long axis of the edge sealing cavity to be sealed.

The ski of the dispensing nozzle, in an example embodiment of the invention, includes a spring or other biasing member to press the ski outwardly slightly away from the dispensing orifice. In an example embodiment of the invention, the surface of the ski that contacts the insulated glass unit is mirror polished and has a shallow radius of curvature. The inventor of the present invention has discovered that a two to four inch radius of curvature is useful for edge sealing insulated glass units of various commonly encountered thicknesses.

The depth sensor, in accordance with an example embodiment of the invention, senses the depth or inset of the spacer along the perimeter of an insulated glass unit and judges the distance from the edge of the glass panes to the location of the spacer. The depth sensor in accordance with an example embodiment may include for example a mechanical finger sensor or an ultrasound sensor. Other types of depth sensors or distance sensors known to those of ordinary skill in the art may be utilized as well. Data from the depth sensor is utilized to adjust the volume of sealant dispensed from the dispensing nozzle to edge seal an insulated glass unit. The depth sensor is valuable because spacers are not always applied exactly parallel to the edge of the insulated glass unit panes.

The edge sealant dispenser may also include a perpendicular moveable dam. The dam, when extended, is generally perpendicular to the edge of the insulated glass unit and to the ski or skis of the dispensing nozzle. The dam functions as stop for aligning the insulated glass unit at a desired location for starting edge sealing. The dam also serves to confine an initial prestart application of adhesive sealant to seal the corner area of an insulated glass unit at the beginning of an edge sealing application. The dam may also be heated in one embodiment of the invention.

The device for sensing movement parallel to the insulated glass unit may include an encoder that senses manual linear movement of the edge sealant dispenser parallel to the fence. The encoder may be embodied in the form of a wheel having a frictional rim which rides against the insulated glass unit when the edge sealant dispenser is moved. The encoder provides speed of movement or relative movement information to the controller to calculate the dispensing rate of the dispensed sealant. In another embodiment of the invention, the device for sensing movement relative to the insulated glass movement may include pinch rollers.

The controller in accordance with the invention includes a human machine interface (HMI). The human machine interface includes a computer monitor, optionally of a touch screen variety, which includes operator controls. For example, the HMI is used to adjust the device for the known width of the spacer in the insulated glass unit, thereby providing one piece of information toward calculating the amount of sealant to be applied. The human machine interface also includes a processor unit which may be based on a personal computer or other dedicated processor. The processor unit can be programmed with the information to operate the single axis applicator.

The sealant supply is supplied to the unit under pressure from a supply of sealant, often a heated 55 gallon drum with a pressure pump. The sealant supply can be any source of supply of sealant whether hot melt sealant, two part sealant or time setting sealant that provides significant sealant to supply the pump metering device in order to allow the edge sealing of insulated glass units.

While the invention has been described so far as being utilized for the horizontally oriented table upon which the glass workpiece is placed, another embodiment of the invention includes a vertical or nearly vertical table against which the glass workpiece rests while supported by a fence. In one embodiment of a vertical or nearly vertical table embodiment, the applicator travels horizontally adjacent to a lower edge of the table and the traveler associated with the rack is positioned upon the lower edge of the table.

In the vertical or nearly vertical table embodiment, a weight compensator may be included coupled to the central suction gripper. In this embodiment, when the corner suction gripper is secured to a corner of the glass workpiece to rotate the glass workpiece, the weight compensator may be used to support some or nearly all of the weight of the glass workpiece to reduce the amount of force required to turn the glass workpiece. Accordingly, a pneumatic cylinder and piston, for example, may be operably secured to the central suction gripper operating in a vertical fashion along the central suction gripper's single axis of movement. The pneumatic cylinder is coupled to a pressurized air supply and a regulator. The regulator, according to an embodiment of the invention, can be controlled by a computer or a milliamp input to adjust the air pressure directed to the pneumatic cylinder to provide sufficient air pressure to compensate for the weight of the glass workpiece during the rotation process. According to an example embodiment of the invention, once the corner suction gripper is applied to the glass workpiece, air pressure may be gradually increased in the pneumatic cylinder until sufficient weight is compensated for so that the motion of the traveler readily turns the glass workpiece.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 13 is a side elevational view of a vertical or nearly vertical single axis applicator according to an embodiment of the invention.

Figure 1:
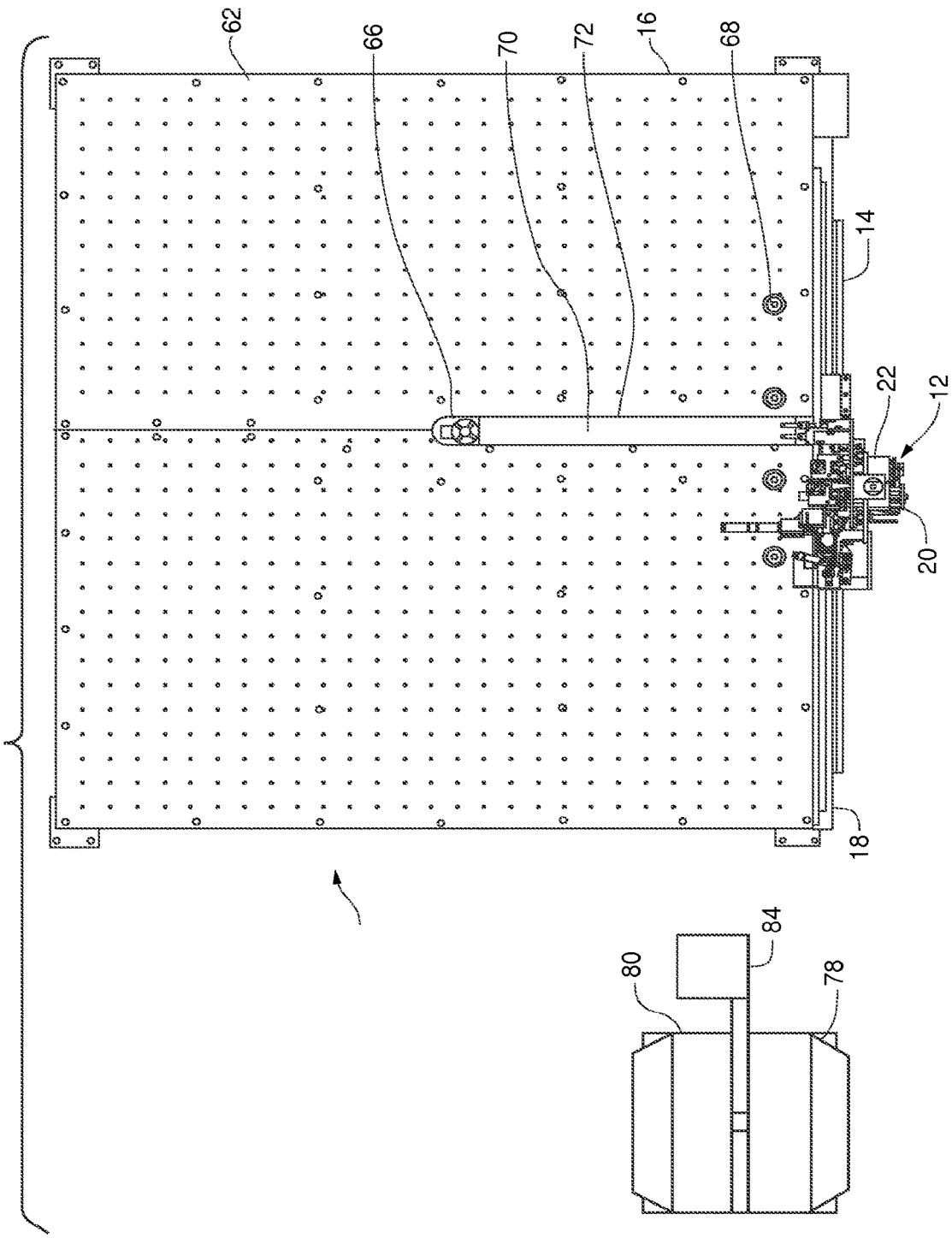
FIG. 1 is a plan view of a single axis applicator according to an example embodiment of the invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 2:
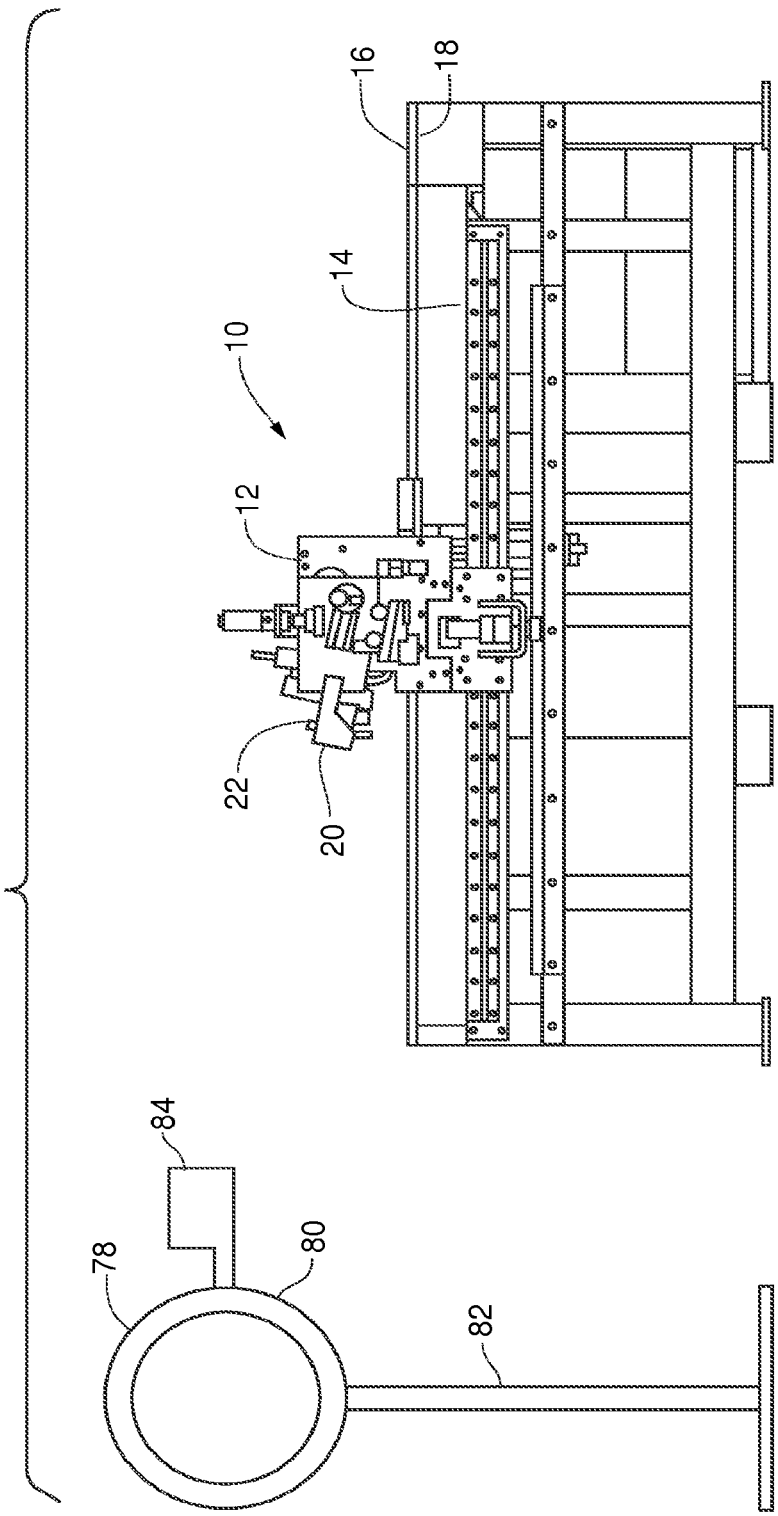
FIG. 2 is a front elevational view of a single axis applicator according to an example embodiment of the invention.
Figure 3:
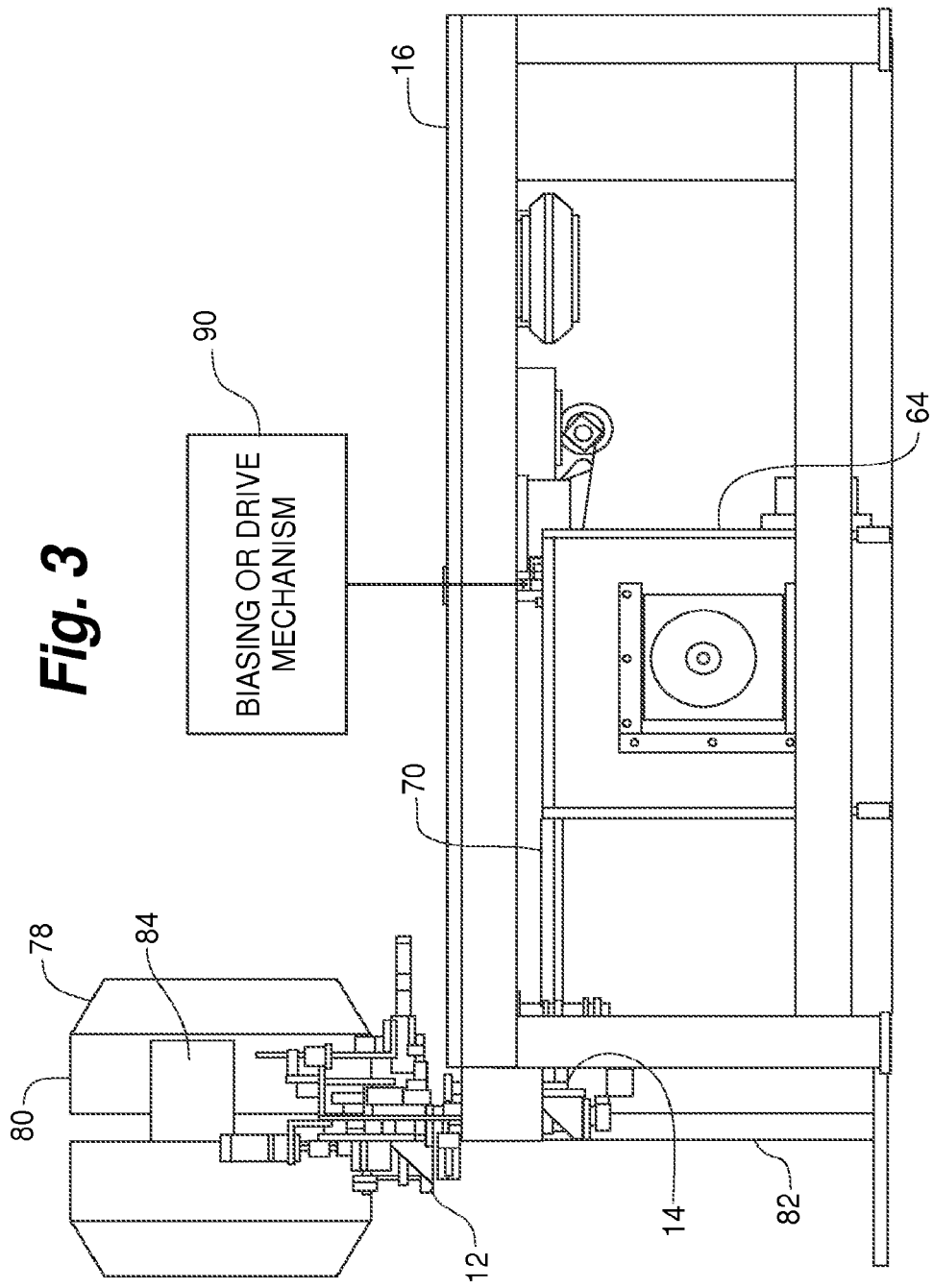
FIG. 3 is a side elevational view of a single axis applicator according to an example embodiment of the invention.
Figure 4:
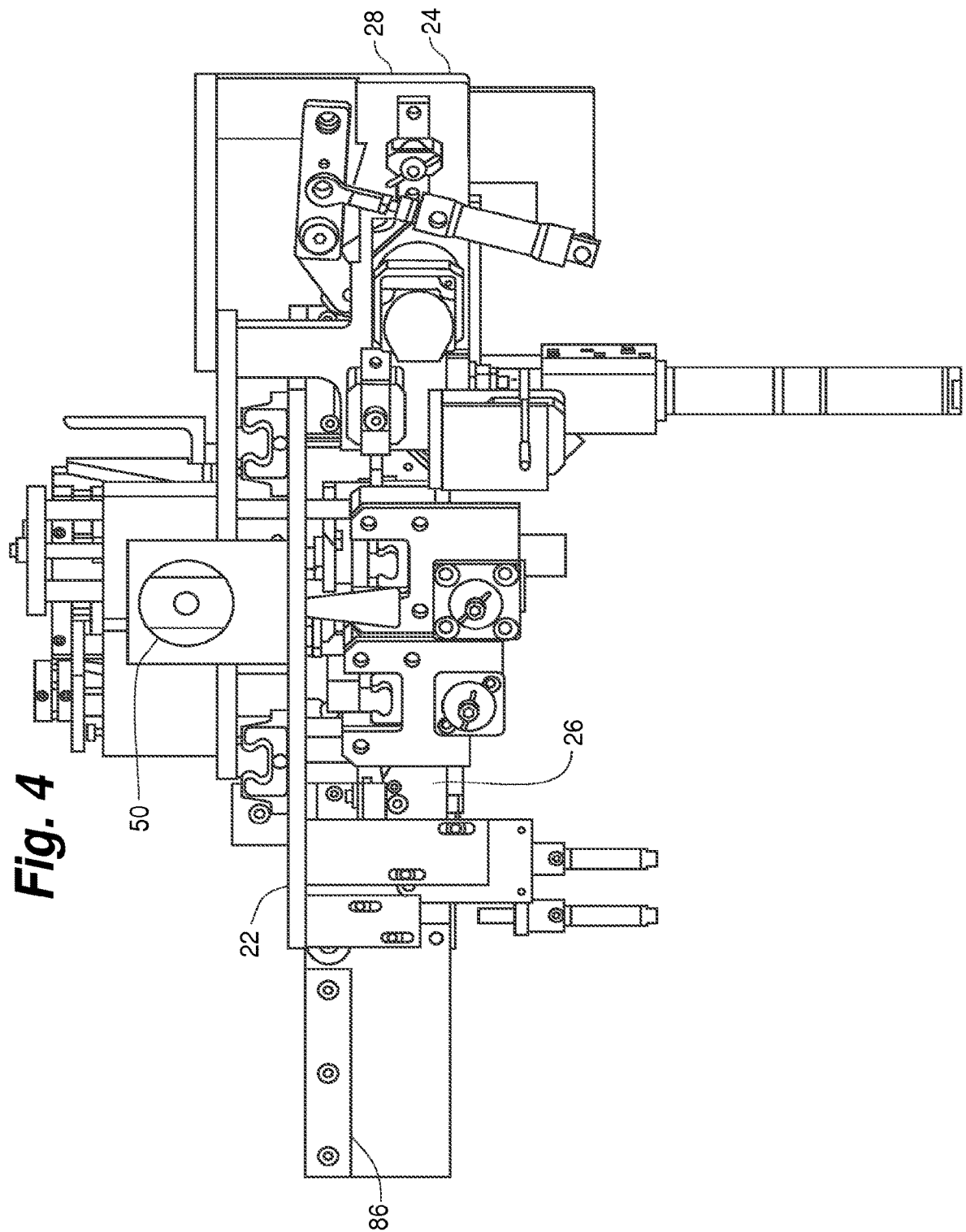
FIG. 4 is a plan view of a traveler including a spacer applicator according to an example embodiment of the invention.
Figure 5:
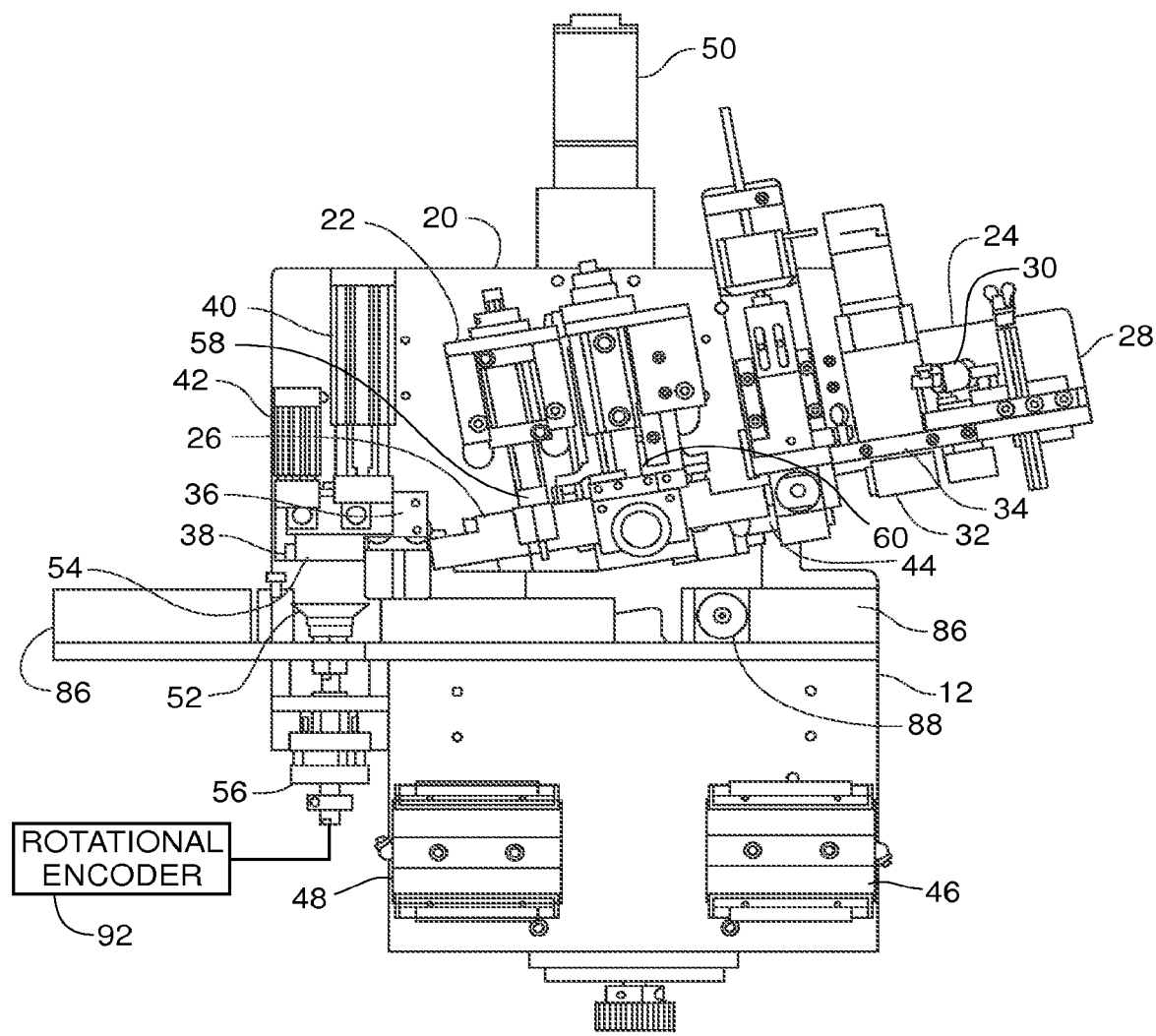
FIG. 5 is an elevational view of a traveler including a spacer applicator according to an example embodiment of the invention.

Referring to FIGS. 1-3, according to an example embodiment, single axis applicator 10 generally includes traveler 12, rack 14 and table 16. Traveler 12 is supported on rack 14 and moveable relative to linear edge 18 of table 16. Rack 14 is secured to table 16 along linear edge 18. Traveler 12 is engaged to rack 14 such that traveler 12 may move linearly along rack 14, generally parallel to linear edge 18 of table 16.

Traveler 12 generally supports applicator 20. Applicator 20 generally includes structure that applies adhesive material to a workpiece such as an insulated glass unit or glass pane (not shown). Applied adhesive material can be, for example, adhesively adherent spacer or adhesive secondary edge sealant.

In one example embodiment, table 16 is sized to accommodate glass panes (not shown) or insulated glass units (not shown) ranging in size from approximately 12×12 inches to 60×60 inches.

Applicator 20 generally includes applicator head 22. Applicator head 22 in one example embodiment generally includes spacer feed system 24 and spacer attachment system 26. Spacer feed system 24 generally includes applicator feed slide 28, applicator feed cylinder 30 and spacer clamp 32. Applicator feed slide 28 is supported slidable and operatively coupled to applicator feed cylinder 30 to move spacer clamp 32. Spacer clamp 32 is supported by spacer clamp traveler 34.

Spacer attachment system 26 generally includes spacer roller 36 and corner press block 38. Spacer roller 36 is sized to press spacer material against a glass workpiece (not shown). Spacer roller 36 is raised and lowered by spacer roller cylinder 40. Corner press block 38 is raised and lowered by corner press block cylinder 42. Applicator head 22 also supports waste vacuum intake 44.

Traveler 12 also supports first direction edge sensor 46, second direction edge sensor 48 and stepper motor 50. First direction edge sensor 46 is adapted to identify a first end of rack 14 while second direction edge sensor 48 is adapted to identify a second end of rack 14. Traveler 12 is operably engaged to rack 14 so that stepper motor 50 may move traveler 12 back and forth along rack 14.

Traveler 12 also supports corner suction gripper 52 and corner gripper backer block 54. Corner suction gripper 52 is a suction cup like device coupled to a selectively activateable vacuum source. Corner gripper backer block 54 is located above a glass workpiece and is adapted to apply pressure downwardly thereon. Corner suction gripper 52 is coupled to corner suction gripper cylinder 56. Corner suction gripper cylinder 56 acts vertically to raise and lower corner suction gripper 52.

Applicator head 22 also includes spacer corner notcher 58 and spacer cutter 60. Spacer corner notcher 58 is adapted to notch an inner corner of a spacer to provide clearance for the spacer being bent ninety degrees at a corner. Spacer cutter 60 is adapted to sever the spacer completely.

Table 16 generally includes air table top 62 and blower 64. Air table top 62 is operably coupled to blower 64 and is pierced by a plurality of openings (not shown). Air table top 62 and blower 64 are generally conventional and are similar to those known in the art.

Table 16 also supports central suction gripper 66 and off center suction gripper 68. Central suction gripper 66 is slidably coupled to slide 70 and travels within central slot 72. Central slot 72 can be an opening cut in table 16. Central suction gripper 66, according to an example embodiment of the invention, may also include axial brake 74 and rotational brake 76. Axial brake 74 can be applied to arrest the movement of central suction gripper 66 relative to slide 70, rotational brake 76 can be applied to arrest the rotational movement of central suction gripper 66. Central suction gripper 66 is generally passive in its rotational and translational movement relative to slide 70. However, according to an example embodiment of the invention, central suction gripper 66 may also be coupled to a locating unit (not shown). Central suction gripper 66 is adapted to grip a glass workpiece as controlled to do so.

Single axis applicator 10 also includes, according to one example embodiment of the invention, spacer supply drum 78. Spacer supply drum 78 generally includes spacer drum 80, adapted to hold a spool of spacer material, base 82 to support spacer drum 80 and outfeed guide 84. Spacer supply drum 78 may be free standing and positioned adjacent the device or may be incorporated into single axis applicator 10.

According to another embodiment of the invention, applicator 20 may further include workpiece fence 86. Workpiece fence 86 may also include fence abutment sensor 88. Fence abutment sensor 88 according to an example embodiment, is shiftable between an extended position and a retracted abutment sensing position.

According to another embodiment of the invention, central suction gripper 66 further includes a biasing or drive mechanism 90 that may assist in positioning central suction gripper 66 to assist in loading, squaring or turning the workpiece. For example, in the case of a workpiece having a high aspect ratio, when a long side of the workpiece is abutted against workpiece fence 86 at the applicator side of table 16, it may be beneficial to assist starting of rotational movement of the workpiece by application of a small force on central suction gripper 66 axially away from workpiece fence 86. This force is applied by biasing or drive mechanism 90. A force axially toward workpiece fence 86 may be useful in squaring the workpiece against workpiece fence 86. A force applied to central suction gripper 66 to position it in the rough center of the workpiece may be useful when initially loading the workpiece onto the table 16.

According to another embodiment of the invention, corner suction gripper 52 includes rotational encoder 92 that senses the rotational movement of corner suction gripper 52 as the workpiece is turned. Output from rotational encoder 92 can be used to sense when the workpiece has turned nearly ninety degrees and to control speed of movement of corner suction gripper 52 as the workpiece approaches contact with workpiece fence 86 at the end of the turning event. Alternately, a rotational encoder 92 can be coupled with central suction gripper 66.

Figure 6:
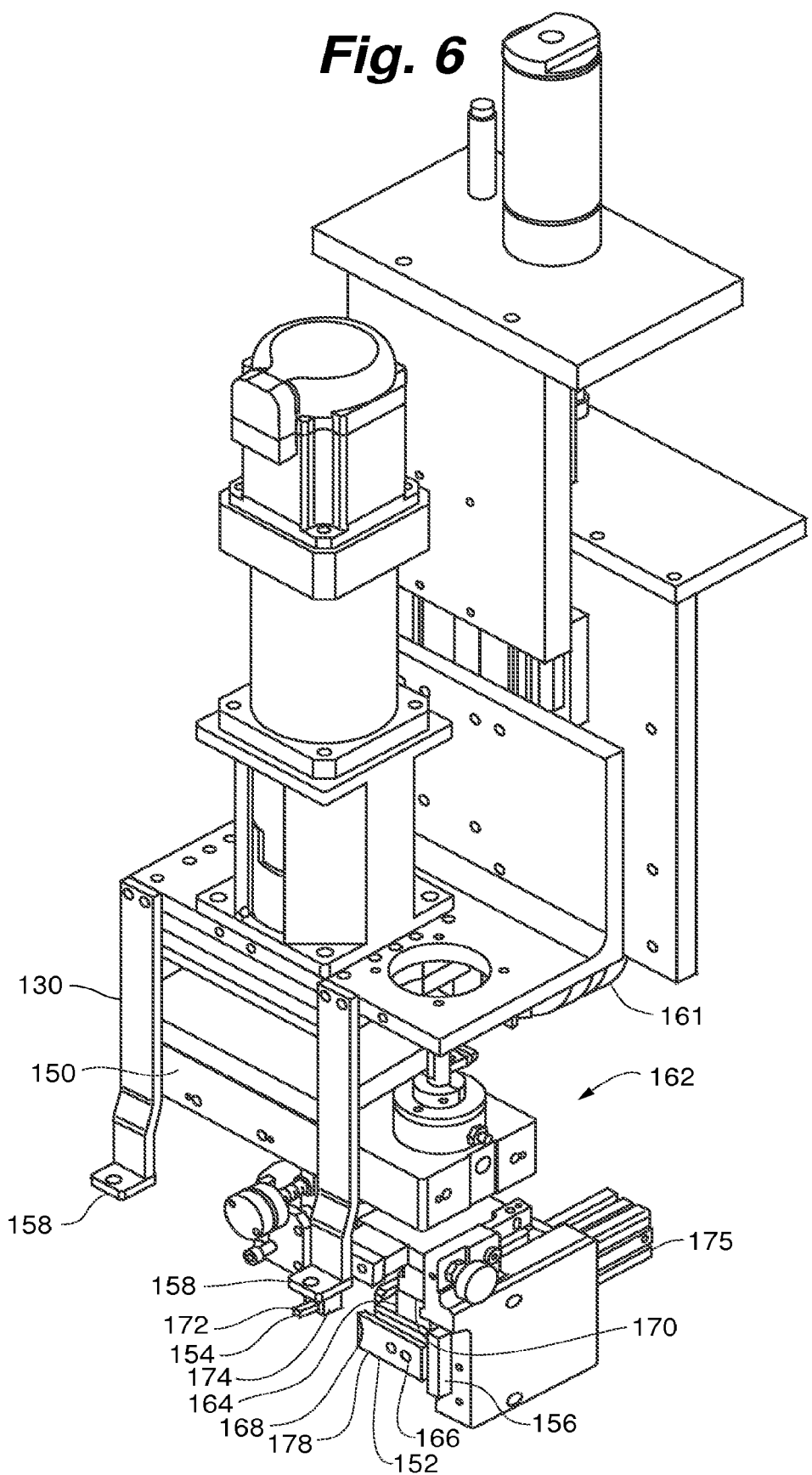
FIG. 6 is a perspective view of an edge sealant applicator according to an example embodiment of the invention.
Figure 7:
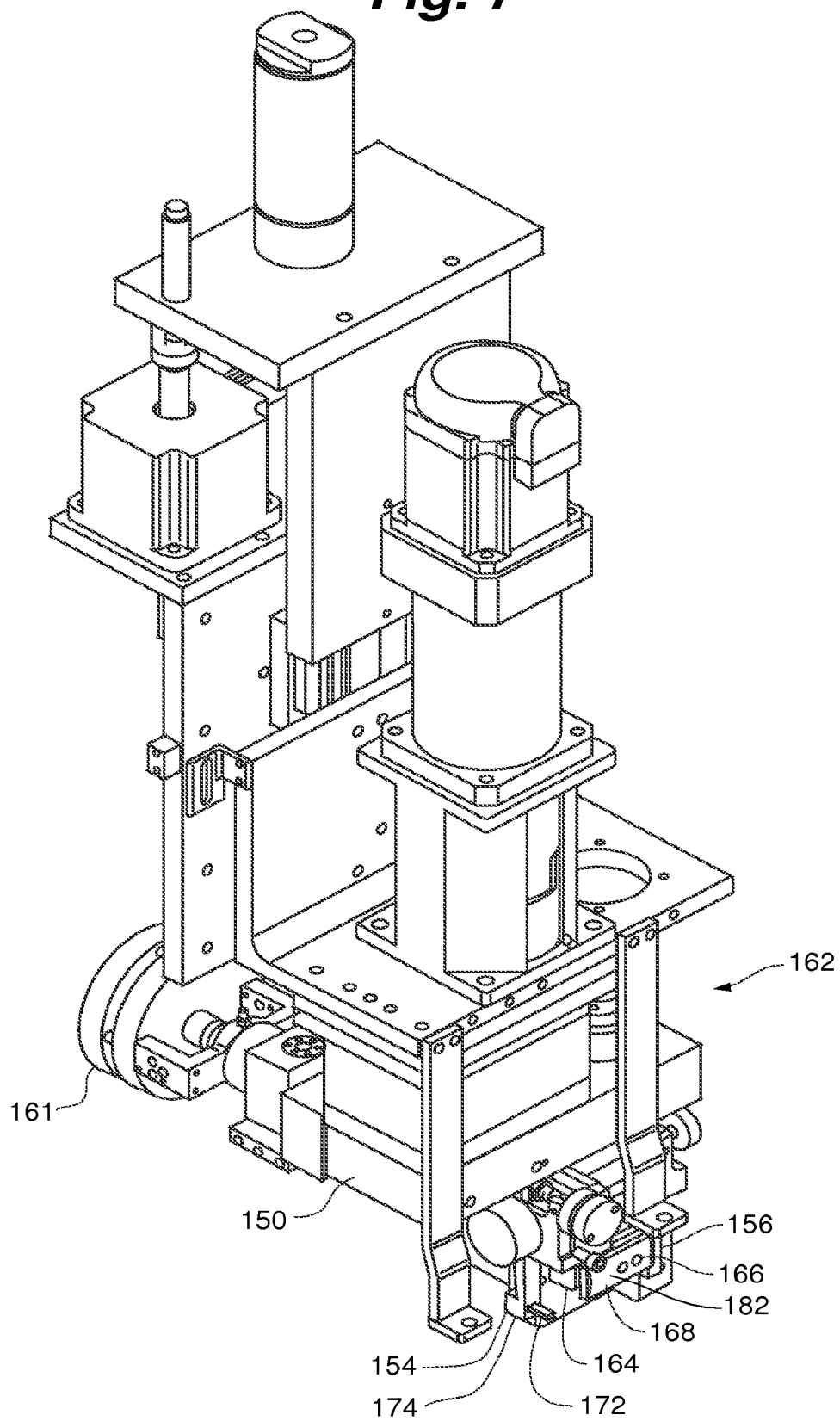
FIG. 7 is another perspective view of the edge sealant applicator according to an example embodiment of the invention.
Figure 8:
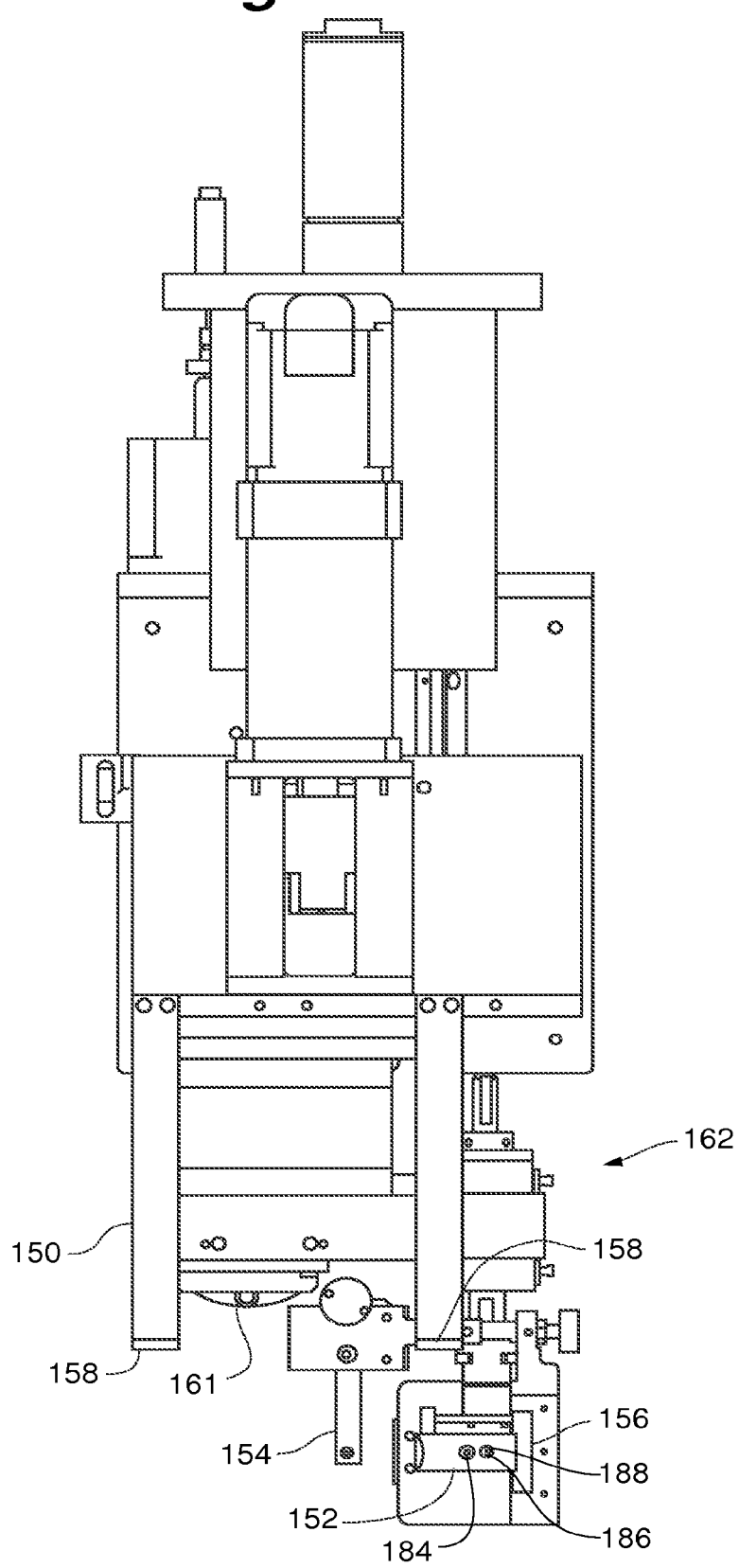
FIG. 8 is a front elevational view of the edge sealant applicator according to an example embodiment of the invention.

Referring to FIGS. 6, 7 and 8, sealant dispenser 126 in accordance with the invention is depicted. Sealant dispenser 126, in an example embodiment, includes high volume metering pump 150, dispensing nozzle 152, depth sensor 154, dam 156, proximity sensors 158 and movement encoder 160.

High volume metering pump 150 in an example embodiment, is a positive displacement gear metering pump. Other types of metering pumps may be used as well.

For example, in one embodiment of the invention, a fifteen gallon per minute pump is utilized so that it operates at thirty to fifty rpm instead of its maximum capacity of approximately two hundred rpm. High volume metering pump 150 is coupled to sealant supply 130 in which sealant is supplied under pressure to high volume metering pump 150. High volume metering pump 150 is also coupled to dispensing nozzle 152. Electrically or pneumatically controlled dispensing valves 161 may be interposed between high volume metering pump 150 and dispensing nozzle 152.

In one example embodiment, dispensing nozzle 152 generally includes body 164, which defines dispensing orifice 166, ski 168 and quick change coupling 170. Dispensing nozzle 152 will be further described below.

Referring to FIGS. 6-8, depth sensor 154 is positioned to a side of dispensing nozzle 152 from which IGUs to be sealed will be presented. In an example embodiment of the invention, depth sensor 154 includes probe 172 coupled to arm 174. Depth sensor 154 is adapted to measure the depth that a spacer in an insulated glass unit is inset relative to the edge of the glass panes to which the spacer is attached. Depth sensor 154 is operably coupled to controller 128 to provide depth information thereto. Depth sensor 154 may include but is not limited to mechanical, electrical, optical or ultrasound depth sensors.

Referring to FIGS. 6-8, dam 156 is depicted in a retracted position. Dam 156 is shiftable between the extended position and the retracted position by actuation of hydraulic, pneumatic or electrical actuators 175. Dam 156 extends outwardly when in the extended position, generally perpendicular to ski 168 of dispensing nozzle 152. Dam 156 may be formed of metal or another material resistant to heat. Dam 156 is located to be directly adjacent to ski 168 and to form a generally right angle thereto.

IGU contact surface 182, according to one embodiment of the invention, is mirror polished to present a very smooth surface. As can be seen in FIGS. 6-8, IGU contact surface 182 is gently curved in a vertical direction. The inventor of the present invention has determined that a two to four inch radius of curvature works well for most IGU edge sealing operations.

Referring to FIGS. 6-8, in single dispensing nozzle 178, ski 168, presents dispense through aperture 184 and mounting aperture 186. Mounting aperture 186 is adapted to receive screw 188 therethrough. Mounting aperture 186 is configured to allow some movement of ski 168 relative to body 164 when screw 188 is tightened.

Figure 9:
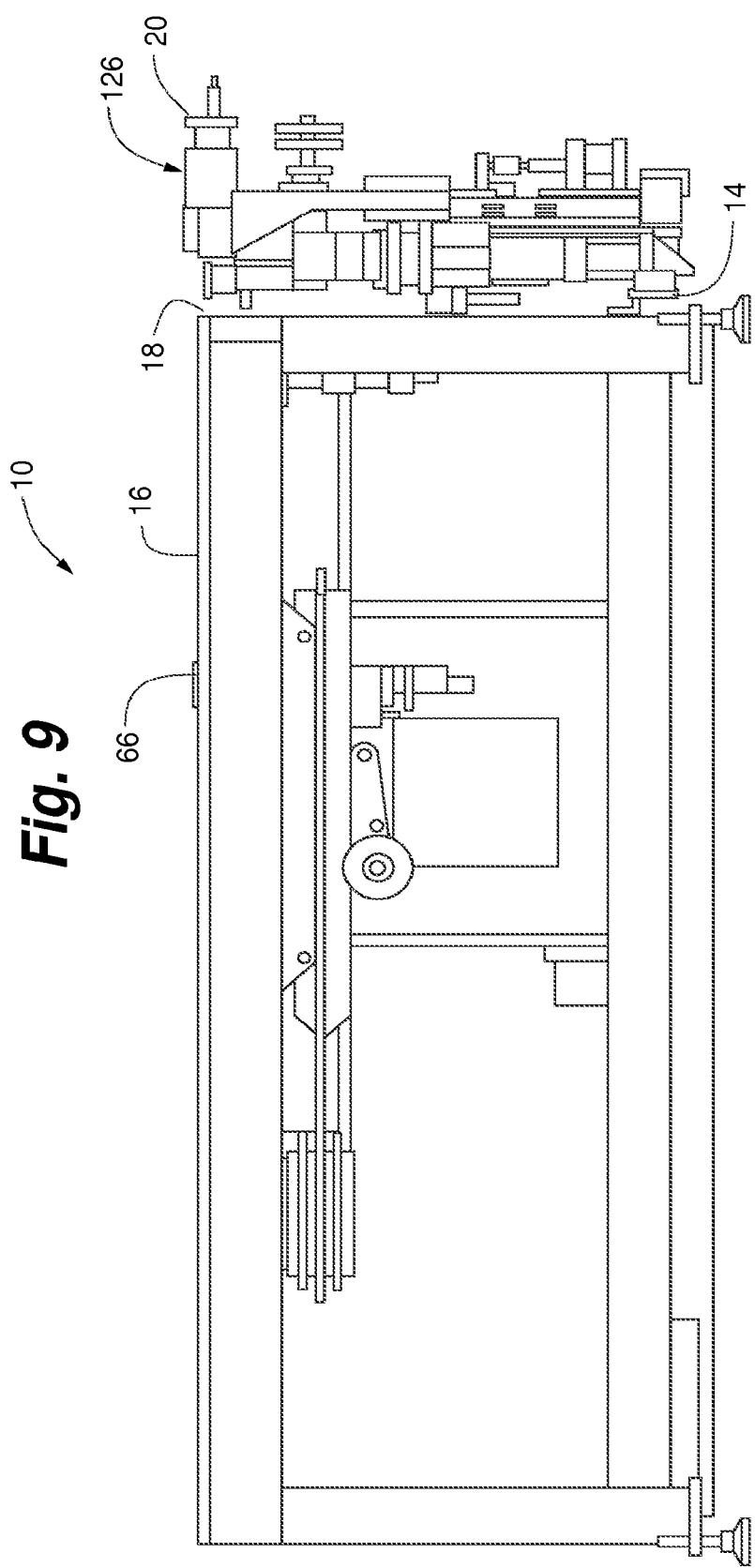
FIG. 9 is a side elevational view of a single axis applicator including a sealant dispensing applicator according to an example embodiment of the invention.

FIG. 9 is a side elevational view of a single axis applicator including an edge sealant applicator according to an example embodiment of the invention.

Figure 10:
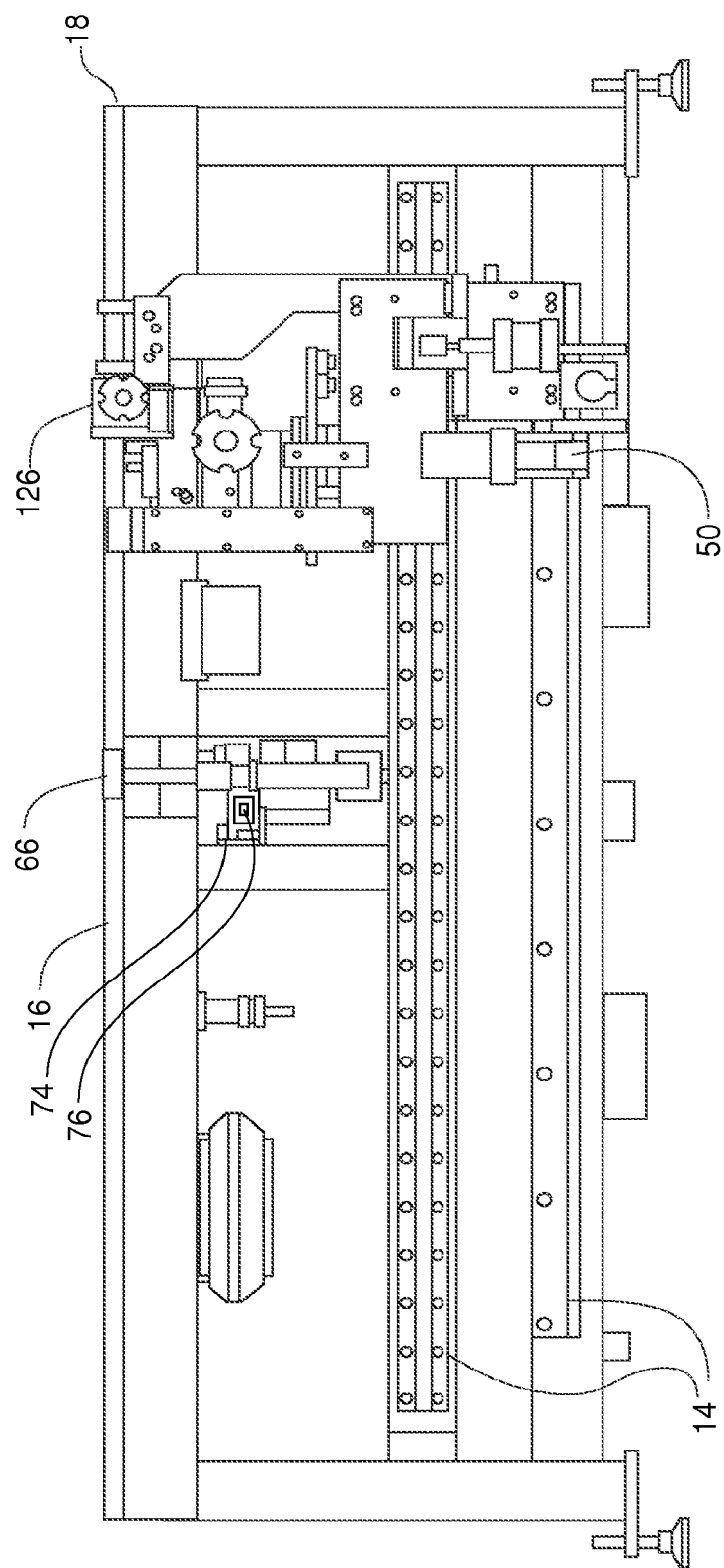
FIG. 10 is a front elevational view of the single axis applicator depicted in FIG. 9.

FIG. 10 is a front elevational view of the single axis applicator depicted in FIG. 9.

Figure 11:
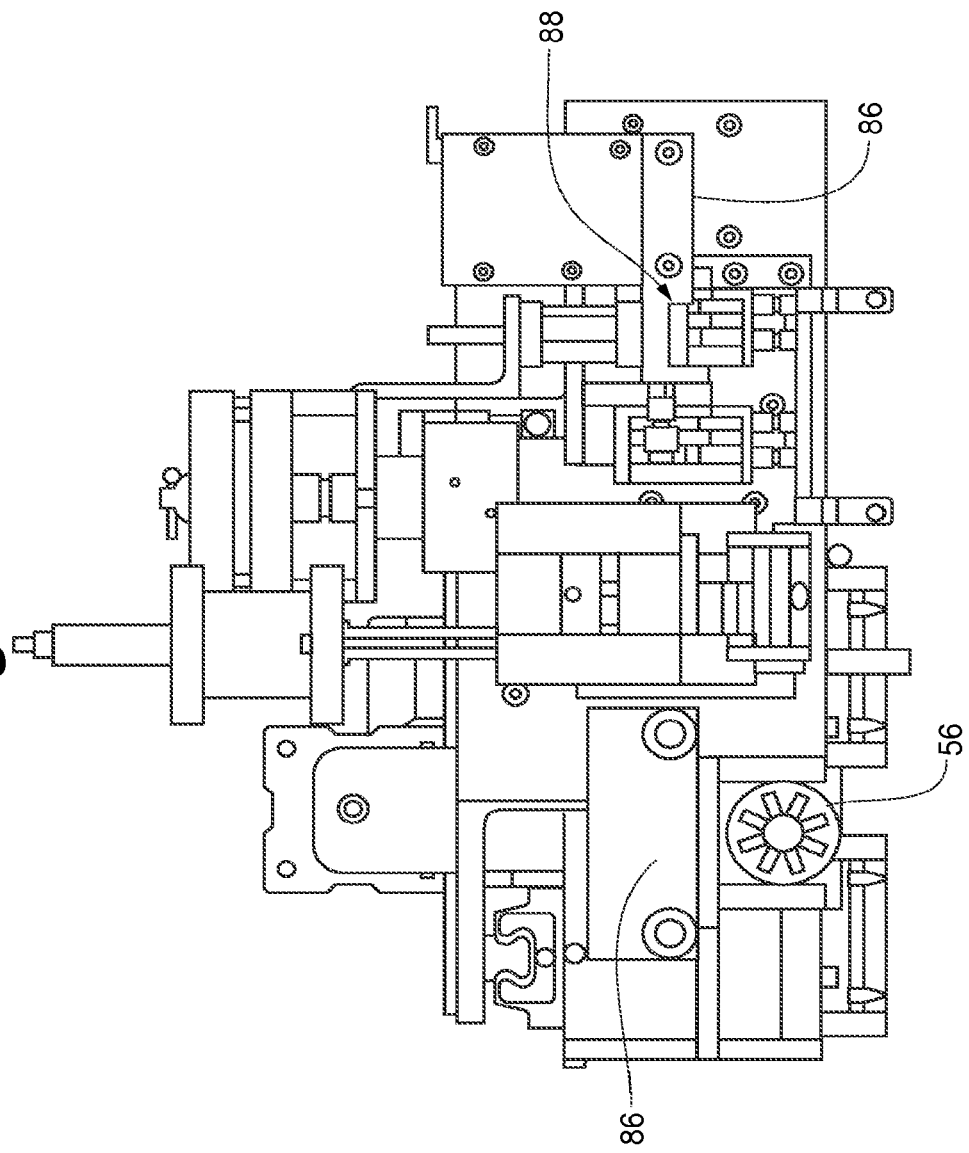
FIG. 11 is a top plan view of an edge sealant dispenser of the single axis applicator of FIGS. 9 and 10.

FIG. 11 is a top plan view of a sealant applicator according to an example embodiment of the invention.

Figure 12:
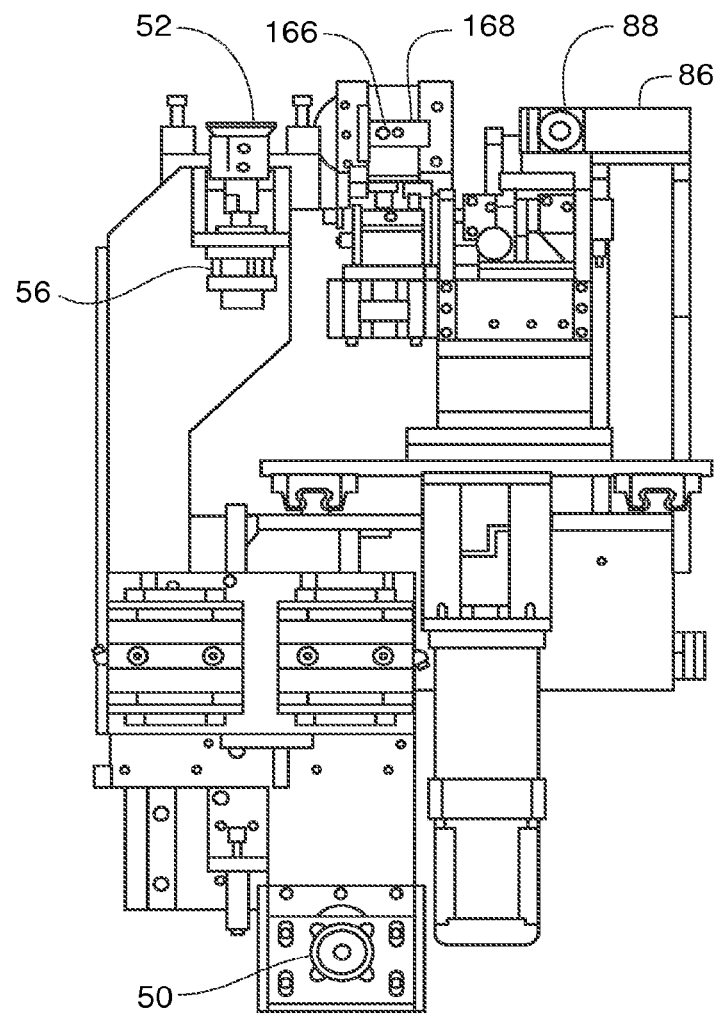
FIG. 12 is a back elevational view of an edge sealant dispenser as depicted in FIG. 11.

FIG. 12 is an elevational view of the sealant applicator depicted in FIG. 11.

Referring to FIGS. 9-12, another embodiment of single axis applicator 10 including sealant dispenser 126 is depicted. According to this embodiment, sealant dispenser 126 is positioned generally below table 16.

Referring particularly to FIG. 10, sealant dispenser 126 travels parallel to linear edge 18. Sealant dispenser 126 is coupled to traveler 12, which travels on rack 14 particularly as depicted in FIG. 10. Stepper motor 50 is engaged with rack 14 along a lower edge thereof.

Referring particularly to FIGS. 11 and 12, sealant dispenser 126 generally includes workpiece fence 86 and fence abutment sensor 88 as described above. Corner suction gripper 52 is operably coupled to corner suction gripper cylinder 56.

Referring to FIG. 13, another embodiment of single axis applicator 10 including sealant dispenser 126 is depicted. In vertical single axis applicator 190, table 16 is positioned in a near vertical or vertical orientation. For example, table 16 is oriented three to five degrees from vertical. Applicator 20 is located along liner edge 18 of table which may include supplemental fence 192. Supplemental fence 192 facilitates placement of glass workpieces and may be retractable once a glass workpiece is gripped and supported by central suction gripper 66 and off center suction gripper 68. Supplemental fence 192 may include rollers or a conveying system to assist in loading and unloading workpieces that can be conveyed or rolled along supplemental fence 192. In addition, according to vertical single axis applicator 190 if air table top 62 is utilized blower 64 can be operated in reverse to assist in supporting a glass workpiece.

Figure 14A:
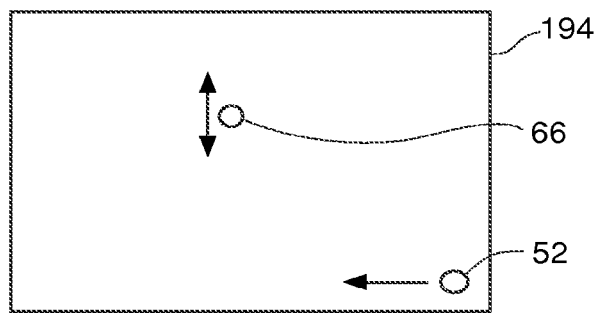
FIGS. 14A-14C depict a sequential turning of a glass workpiece according to an embodiment of the invention.
Figure 14B:
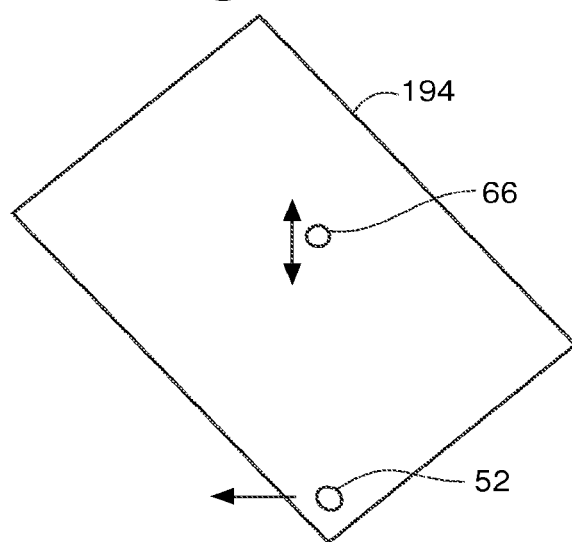
Figure 14C:
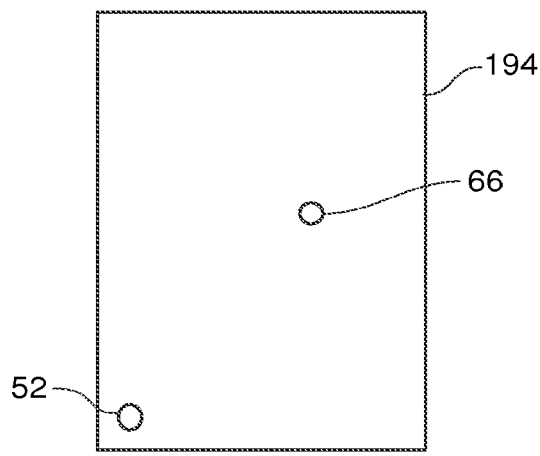

Referring to FIGS. 14A-14C, the turning of a glass workpiece 194 is sequentially depicted.

Referring to FIG. 14A, a rectangular glass workpiece 194 is shown in a generally horizontal orientation. As viewed in FIG. 14A, central suction gripper 66 is secured by suction to glass workpiece 194 in a generally central area of glass workpiece 194. It is notable that while central suction gripper 66 can be located at the precise center of glass workpiece 194, it is not necessary for central suction gripper 66 to be located precisely centrally. Corner suction gripper 52 is located initially at the lower right corner of glass workpiece 194. As depicted in FIG. 14B, as corner suction gripper 52 travels linearly from right to left, central suction gripper 66 travels along a linear path substantially perpendicular to that of corner suction gripper 52 along slide 70 in central slot 72 of single axis applicator 10. Initially as corner suction gripper 52 travels from the position depicted in FIG. 14A to the position depicted in FIG. 14B, central suction gripper 66 travels upwardly along slide 70. As glass workpiece 194 is turned from the position depicted in FIG. 14B to the position depicted in FIG. 14C, corner suction gripper 52 continues traveling in a straight line to the left to the fully turned position depicted in FIG. 14C. At the same time, central suction gripper 66 travels downwardly until the completely turned position depicted in FIG. 14C is achieved.

As discussed elsewhere in this application, fence abutment sensor 88 senses when the fully turned position depicted in FIG. 14C is achieved and a signal may be sent to stop motion of corner suction gripper 52 as well the motion of traveler 12 along rack 14.

In operation, referring to FIGS. 1-5, a glass work piece (not shown) is placed on table 16. Central suction gripper 66 is activated to grip a central location in the glass workpiece. Central suction gripper 66 need only be secured to the glass workpiece at a generally central location and need not be specifically located at a geometric center of the glass workpiece.

The glass workpiece is abutted against workpiece fence 86. In doing so, fence abutment sensor 88 is pressed inward until it is even with workpiece fence 86.

Applicator 20 is then activated. First direction edge sensor 46 senses an edge of the glass workpiece. First direction edge sensor 46 is located a known distance from a first end of the spacer material as applied. The position of applicator 20 is adjusted so that the output of applicator 20 is at the desired location near a first corner of the glass workpiece. Traveler 12 then begins from its start position and travels to its end position while applicator 20 applies an adhesive spacer or edge sealant to the glass workpiece. Second direction edge sensor 48 identifies the second edge of the glass workpiece. Second direction edge sensor 48 is a known distance from the output of applicator 20 and thus applicator 20 travels to a precise location at the second edge of the glass workpiece. Traveler 12 and applicator 20, then are moved to locate corner suction gripper 52 proximate a corner of the glass workpiece. Corner suction gripper 52 is engaged to the glass workpiece by suction and corner gripper backer block 54 is moved into contact with the glass workpiece thus gripping the glass workpiece between corner suction gripper 52 and corner gripper backer block 54.

Traveler 12 along with applicator 20 then moves in a returned direction to its starting point, in doing so, corner suction gripper 52 is moved linearly while the glass workpiece pivots about central suction gripper 66. While traveler 12 and applicator 20 are moving in a return direction, central suction gripper 66 is free to move linearly and rotationally because rotational brake 76 and axial brake 74 are released.

At the same time, fence abutment sensor 88 is extended relative to workpiece fence 86. As the glass workpiece turns, it comes into contact with fence abutment sensor 88 pressing fence abutment sensor 88 until it is even with workpiece fence 86. At this point, traveler 12 along with applicator 20 stops moving and a second edge of the glass workpiece is now parallel with and abutting workpiece fence 86. The second edge of the glass workpiece is also parallel with linear edge 18. Axial brake 74 and rotational brake 76 are activated to secure central suction gripper 66 against rotation. Further, off center suction gripper 68 is activated to grip the glass workpiece at an off center location. The combined action of axial brake 74, rotational brake 76 and off center suction gripper 68 serves to secure the glass workpiece in a fixed orientation with its edge parallel to the travel of traveler 12 and applicator 20.

In the case in which applicator 20 is a spacer applicator, applicator head 22 advances, for example, to the right front corner of the glass workpiece. Spacer material is applied to the glass workpiece and pressed against the glass workpiece by spacer roller 36 as applicator head 22 travels along the glass workpiece. When applicator head 22 reaches the left front corner, spacer corner notcher 58 is activated to make a corner notch in the spacer material. Spacer feed system 24 is activated to create slack in the spacer material which is still attached to the piece of spacer material that is secured along a first edge of the glass workpiece. Corner suction gripper 52 is activated and corner gripper backer block 54 is activated. Applicator head 22 then returns to the right hand position while taking the corner of the glass workpiece with it. The glass workpiece pivots on central suction gripper 66 which is free to rotate and translate. Prior to return of applicator head 22 to the original position, off center suction gripper 68 is deactivated and axial brake 74 and rotational brake 76 are deactivated.

When fence abutment sensor 88 is pressed inward by the glass workpiece and senses that the glass workpiece is firmly against workpiece fence 86, off center suction gripper 68, axial brake 74 and rotational brake 76 are reactivated.

If Table 16 is an air table, blower 64 is activated to blow air through air table top 62 while the glass workpiece is rotated. After the glass rotation, applicator feed slide 28 and applicator feed cylinder 30 are actuated to apply spacer material to the second side of the glass workpiece, corner press block 38 is lowered to secure the spacer at the corner and spacer roller 36 is activated to press the spacer material against the glass workpiece.

The process is repeated until the fourth corner of the glass workpiece is reached. Then spacer cutter 60 is activated to sever the spacer material from its roll and corner press block 38 is activated to press the spacer material firmly against the glass workpiece. When the glass workpiece has spacer material applied to all four edges, central suction gripper 66 is deactivated, off center suction gripper 68 is deactivated, blower 64 is activated, if an air table is used, and the glass workpiece is manually slid off the table.

In the event that applicator 20 is a sealant dispenser 126, a similar cycle is used. In this event, the glass workpiece is an insulated glass unit with two panes of glass and spacer material already applied between the two panes of glass. The glass workpiece is located on the table and abutted against workpiece fence 86 activating fence abutment sensor 88. Central suction gripper 66 is activated. Off center suction gripper 68 is activated. Blower 64 is deactivated, if an air table is used. Once the dispensing nozzle 152 is in position against the glass workpiece, depth sensor 154 judges the depth of the space into which the sealant materials to be dispensed. Dam 156 is advanced to abut a corner of the insulated glass unit. High volume metering pump is activated to dispense sealant material via dispensing orifice 166. Once the corner area is filled dam 156 is retracted. Ski 168 is in contact with the edge of the insulated glass unit and sealant material is dispensed and smoothed by ski 168 as it moves along the edge of the insulated glass unit. When sealant dispenser 126 reaches the second end of the side of the insulated glass unit, high volume metering pump 150 is deactivated and sealant stops exiting dispensing nozzle 152. Central suction gripper 66 remains secured to the insulated glass unit while off center suction gripper 68 is deactivated and axial brake 74, rotational brake 76 are deactivated. Corner suction gripper 52 is activated and sealant dispenser 126 returns to its start position along with traveler 12. The operation continues in this way turning the insulated glass unit as each side is completed as discussed above.

Referring to FIG. 13, another embodiment of single axis applicator 10 is depicted. Vertical single axis applicator 190 is similar in structure and design to the previous described embodiments, however, table 16 is oriented approximately vertical, for example, within 3 to 5° of vertical. In the depicted embodiments, single axis applicator 10 is supported by legs 193 so that table 16 is vertical or nearly vertical in orientation and traveler 12 and rack 14 supporting in this example embodiment sealant dispenser 126 travel along a lower edge thereof.

In operation, vertical single axis applicator 190 operates similarly to the other embodiments described herein. A glass workpiece (not shown) is placed on the table in a nearly vertical orientation. Central suction gripper 66 and off center suction gripper 68 are actuated to grip the glass workpiece. Optionally, blower 64 is actuated to provide negative pressure to air table top 62 to further support the glass workpiece.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A single axis application unit for processing a glass workpiece, comprising:
a substantially vertically oriented workpiece supporting structure against which a glass workpiece may be positioned, the substantially vertically oriented workpiece supporting structure presenting at least one glass workpiece support, the at least one glass workpiece support supporting the workpiece along at least one edge thereof;
an applicator movable on a traveler shiftable along a first linear axis oriented parallel to and outwardly of at least one edge of the substantially vertically oriented workpiece supporting structure, the applicator being structured to apply adhesive material to an edge of the glass workpiece;
a central suction unit that is activateable to grip the glass workpiece, the central suction unit travelling along a second linear axis oriented generally perpendicular to the first linear axis and travel of the central suction unit being limited within a perimeter of the substantially vertically oriented workpiece supporting structure, the central suction unit being freely moveable both translationally and rotationally at least some of the time;
a mid-peripheral suction unit located at a fixed location remote from the central suction unit and being selectively activateable to grip the glass workpiece to hold the glass workpiece in a fixed orientation; and
a corner suction gripper coupled to and movable with the traveler and the applicator parallel to the first linear axis, the corner suction gripper being selectively activateable to grip the glass workpiece proximate a corner of the glass workpiece.

2. The single axis application unit as claimed in claim 1, further comprising a central suction unit brake that selectively secures the central suction unit both rotationally and translationally and releases the central suction unit wherein the central suction unit is freely movable both translationally and rotationally.

3. The single axis application unit as claimed in claim 1, wherein the applicator comprises an insulated glass unit spacer applicator.

4. The single axis application unit as claimed in claim 3, wherein the insulated glass unit spacer applicator further comprises a spacer clamp, a spacer corner notcher and a spacer cutter coupled to and movable with the insulated glass unit spacer applicator.

5. The single axis application unit as claimed in claim 3, wherein the insulated glass unit spacer applicator further comprises a corner gripper backer block that is selectively shiftable between a downwardly bearing position and an upward retracted position.

6. The single axis application unit as claimed in claim 3, wherein the insulated glass unit spacer applicator further comprises a corner press block that is selectively shiftable from a retracted position to a spacer corner pressing position.

7. The single axis application unit as claimed in claim 3, wherein the insulated glass unit spacer applicator further comprises a spacer clamp coupled to a spacer clamp traveler, the spacer clamp being operable shiftable linearly between an advanced position and a retracted position.

8. The single axis application unit as claimed in claim 1, further comprising an alignment fence coupled to the applicator and oriented generally parallel to and outwardly of the edge of the substantially vertically oriented workpiece supporting structure.

9. The single axis application unit as claimed in claim 1, further comprising a first directional edge sensor and a second directional edge sensor coupled to the applicator; the first directional edge sensor sensing a location of a first edge of the glass workpiece and the second directional edge sensor sensing a location of a second edge of the glass workpiece.

10. The single axis application unit as claimed in claim 1, wherein the applicator comprises a secondary edge sealant applicator.

11. The single axis application unit as claimed in claim 10, wherein the secondary edge sealant applicator further includes a metering pump, a dispensing nozzle and a depth sensor.

12. The single axis application unit as claimed in claim 11, wherein the dispensing nozzle further includes a ski and defines a dispensing orifice.

13. The single axis application unit as claimed in claim 1, further comprising a weight compensation unit that provides an upward force on the central suction unit to at least partially compensate for a weight of the glass workpiece.

14. The single axis application unit as claimed in claim 13, wherein the weight compensation unit further comprises a pneumatic cylinder coupled to a regulator.

15. The single axis application unit as claimed in claim 14, wherein the regulator is controlled by a computer or milliamp input to adjust air pressure in response to the weight of the glass workpiece.

* * * * *

UNITED STATES PATENT AND TRADEMARK OFFICE
CERTIFICATE OF CORRECTION

PATENT NO.        : 10,596,793 B2
APPLICATION NO.   : 15/604195
DATED             : March 24, 2020
INVENTOR(S)       : Morgan Donohue Page 1 of 1

It is certified that error appears in the above-identified patent and that said Letters Patent is hereby corrected as shown below:

In the Specification

Column 1, Line 65, delete "genera" and insert --generally--

Signed and Sealed this
Third Day of November, 2020

Andrei Iancu
*Director of the United States Patent and Trademark Office*